(12) United States Patent
Hsiao et al.

(10) Patent No.: US 11,479,027 B2
(45) Date of Patent: Oct. 25, 2022

(54) PHOTOSENSITIVE ELECTRICALLY CONDUCTIVE STRUCTURE AND TOUCH SENSOR

(71) Applicant: Cambrios Film Solutions Corporation, Tortola (VG)

(72) Inventors: Chung-Chin Hsiao, Zhubei (TW); Siou-Cheng Lien, Toufen (TW); Chia-Yang Tsai, New Taipei (TW); Shu-Ping Hsu, Hsinchu (TW)

(73) Assignee: Cambrios Film Solutions Corporation, Tortola (VG)

( * ) Notice: Subject to any disclaimer, the term of this patent is extended or adjusted under 35 U.S.C. 154(b) by 85 days.

(21) Appl. No.: 17/030,843

(22) Filed: Sep. 24, 2020

(65) Prior Publication Data

US 2022/0088909 A1    Mar. 24, 2022

(51) Int. Cl.
| | | |
|---|---|---|
| *G06F 3/041* | (2006.01) |
| *G06F 3/044* | (2006.01) |
| *B32B 27/30* | (2006.01) |
| *G06F 3/042* | (2006.01) |
| *B32B 15/01* | (2006.01) |
| *C08K 5/053* | (2006.01) |

(52) U.S. Cl.
CPC .......... *B32B 27/308* (2013.01); *B32B 15/018* (2013.01); *C08K 5/053* (2013.01); *G06F 3/042* (2013.01); *B32B 2311/08* (2013.01); *B32B 2367/00* (2013.01); *B32B 2375/00* (2013.01); *C08K 2201/00* (2013.01)

(58) Field of Classification Search
CPC ..................................................... G03F 7/0007
See application file for complete search history.

(56) References Cited

U.S. PATENT DOCUMENTS

2015/0220202 A1* 8/2015 Choung ................ G06F 3/0446
216/13
2016/0330845 A1* 11/2016 Okade ..................... C25D 3/38

FOREIGN PATENT DOCUMENTS

| TW | 201525106 A | 7/2015 |
| TW | 201606607 A | 2/2016 |
| TW | 202004840 A | 1/2020 |

* cited by examiner

*Primary Examiner* — Nan-Ying Yang
(74) *Attorney, Agent, or Firm* — Cooper Legal Group, LLC

(57) ABSTRACT

A photosensitive electrically conductive structure includes: a substrate; a releasing photosensitizing resin layer disposed on the substrate; a nano silver layer disposed on the releasing photosensitizing resin layer; and a photosensitive electrically conductive layer disposed on an edge of the nano silver layer. A visible region is defined in the photosensitive electrically conductive structure where the nano silver layer is not covered by the photosensitive electrically conductive layer and a peripheral wiring region is defined in the photosensitive electrically conductive structure where the nano silver layer is covered by the photosensitive electrically conductive layer. The releasing photosensitizing resin layer has an average molecular weight (Mn) greater than 3,000 but less than 100,000, and the releasing photosensitizing resin layer, the nano silver layer, and the photosensitive electrically conductive layer are patterned. A touch sensor includes at least one layer of the photosensitive electrically conductive structure.

20 Claims, 6 Drawing Sheets

(test 2-1)
 (test 2-2)
 (test 2-3)
 (test 2-4)

PHOTOSENSITIVE ELECTRICALLY CONDUCTIVE STRUCTURE AND TOUCH SENSOR

BACKGROUND

1. Field of the Disclosure

The present disclosure relates to photosensitive electrically conductive structures, and in particular to a photosensitive electrically conductive structure comprising a releasing photosensitizing resin layer. The present disclosure further relates to a touch sensor comprising the photosensitive electrically conductive structure.

2. Description of the Related Art

A conventional photosensitive electrically conductive structure can be provided in a conventional touch sensor. A peripheral wiring region of the photosensitive electrically conductive structure in the touch sensor is produced by screen printing. Owing to poor alignment during a screen printing process, contact impedance instability may occur, leading to signal loss and distortion.

SUMMARY

An objective of the present disclosure is to provide a photosensitive electrically conductive structure and a touch sensor to prevent contact impedance instability which might otherwise be caused by poor alignment during a screen printing process performed to produce a peripheral wiring region of a conventional photosensitive electrically conductive structure.

To achieve at least the above objective, the present disclosure provides a photosensitive electrically conductive structure comprising:

a substrate;

a releasing photosensitizing resin layer disposed on the substrate;

a nano silver layer disposed on the releasing photosensitizing resin layer; and a photosensitive electrically conductive layer disposed on an edge of the nano silver layer, wherein a visible region is defined in the photosensitive electrically conductive structure where the nano silver layer is not covered by the photosensitive electrically conductive layer and a peripheral wiring region is defined in the photosensitive electrically conductive structure where the nano silver layer is covered by the photosensitive electrically conductive layer, wherein the releasing photosensitizing resin layer has an average molecular weight (Mn) greater than 3,000 but less than 100,000, wherein the releasing photosensitizing resin layer, the nano silver layer and the photosensitive electrically conductive layer are patterned.

Regarding the photosensitive electrically conductive structure, wherein the average molecular weight (Mn) of the releasing photosensitizing resin layer is greater than 3,000 but less than 200,000.

Regarding the photosensitive electrically conductive structure, wherein the releasing photosensitizing resin layer is formed by coating a releasing photosensitizing resin composition on the substrate and selectively curing the releasing photosensitizing resin composition, wherein the releasing photosensitizing resin composition comprises:

(A) a photopolymerization initiator;

(B) at least one of a polymeric compound or a compound with an ethylenically unsaturated double bond; and (C) a solvent, wherein the at least one of the polymeric compound or the compound with an ethylenically unsaturated double bond is selected from the group consisting of acrylic ester, polyurethane and acrylate resin.

Regarding the photosensitive electrically conductive structure, wherein the releasing photosensitizing resin composition further comprises: (D) an additive.

Regarding the photosensitive electrically conductive structure, wherein the additive is selected from the group consisting of fluorine-containing surfactant, non-ionic surfactant, cation surfactant, anion surfactant and organic silicon surfactant.

Regarding the photosensitive electrically conductive structure, wherein the polymeric compound has a molecular weight greater than 500 but less than 10,000.

Regarding the photosensitive electrically conductive structure, wherein the polymeric compound has a molecular weight greater than 3,000 but less than 6,000.

Regarding the photosensitive electrically conductive structure, wherein the polymeric compound has a molecular weight less than 1,000.

Regarding the photosensitive electrically conductive structure, wherein a degree of penetration of optical performance of the visible region is greater than 90% and a yellowing value b* of the visible region is not greater than 2.

Regarding the photosensitive electrically conductive structure, wherein the photosensitive electrically conductive structure undergoes an exposure-development process whereby the releasing photosensitizing resin layer, the nano silver layer, and the photosensitive electrically conductive layer are patterned simultaneously.

Regarding the photosensitive electrically conductive structure, wherein the exposure-development process uses a solvent developer to perform development, and the solvent developer is selected from the group consisting of propylene glycol methyl ether (PGME), diacetone alcohol (DAA), diethylene glycol monomethyl ether (DGME), and isopropyl alcohol (IPA).

Regarding the photosensitive electrically conductive structure, further comprising:

a second releasing photosensitizing resin layer disposed below the substrate;

a second nano silver layer disposed below the second releasing photosensitizing resin layer;

a second photosensitive electrically conductive layer disposed within the peripheral wiring region below an edge of the second nano silver layer, wherein the second releasing photosensitizing resin layer has an average molecular weight (Mn) greater than 3,000 but less than 100,000, wherein the second releasing photosensitizing resin layer, the second nano silver layer and the second photosensitive electrically conductive layer are patterned.

To achieve at least the above objective, the present disclosure provides a touch sensor comprising at least one layer of the photosensitive electrically conductive structure.

The photosensitive electrically conductive structure of the present disclosure comprises a photosensitive silver electrically conductive layer whereby the photosensitive electrically conductive structure undergoes a one-time exposure-development process to not only pattern the releasing photosensitizing resin layer, the nano silver layer, and the photosensitive electrically conductive layer simultaneously but also preclude high contact impedance otherwise caused by poor alignment during a screen printing process of a conventional touch sensor having a photosensitive electrically conductive layer.

DETAILED DESCRIPTION

The implementation of the present invention is illustrated by the specific embodiments as follows, so one skilled in the art may understand other advantages and effects of the present invention by the contents disclosed in the specification. The present invention may also be implemented or applied by other embodiments, and the details in the specification may also be based on different views and applications without departing from the spirit of the present invention for various modifications and variations.

Unless otherwise specified, the singular determiner "a", "an" and "the" used hereunder may also be interpreted to mean plurality.

Unless otherwise specified, the conjunction "or" used hereunder may also be interpreted to mean "and/or".

First Embodiment

Figure 1:
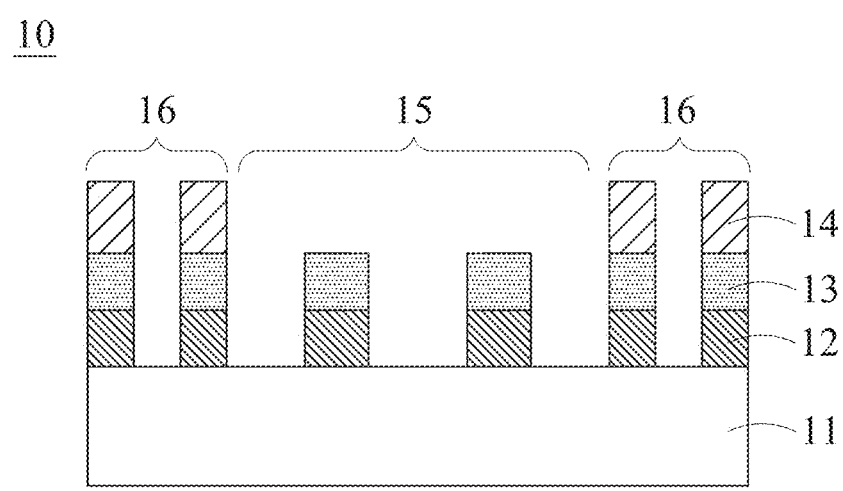
FIG. 1 is a schematic view of a photosensitive electrically conductive structure according to a first embodiment of the present disclosure.

FIG. 1 is a schematic view of a photosensitive electrically conductive structure 10 according to the first embodiment of the present disclosure. Referring to FIG. 1, the photosensitive electrically conductive structure 10 comprises: a substrate 11; a releasing photosensitizing resin layer 12 disposed on the substrate 11; a nano silver layer 13 disposed on the releasing photosensitizing resin layer 12; and a photosensitive electrically conductive layer 14 disposed on an edge of the nano silver layer 13. A visible region 15 is defined in the photosensitive electrically conductive structure 10 where the nano silver layer 13 is not covered by the photosensitive electrically conductive layer 14 and a peripheral wiring region 16 is defined in the photosensitive electrically conductive structure 10 where the nano silver layer 13 is covered by photosensitive electrically conductive layer 14. The releasing photosensitizing resin layer 12 has an average molecular weight (Mn) greater than 3,000 but less than 100,000. The photosensitive electrically conductive structure 10 undergoes an exposure-development process whereby the releasing photosensitizing resin layer 12, the nano silver layer 13, and the photosensitive electrically conductive layer 14 are patterned simultaneously.

In the first embodiment, the releasing photosensitizing resin layer 12, nano silver layer 13, and photosensitive electrically conductive layer 14 are patterned, such that the releasing photosensitizing resin layer 12, nano silver layer 13, and photosensitive electrically conductive layer 14 cover only part of the substrate 11.

Figure 2:
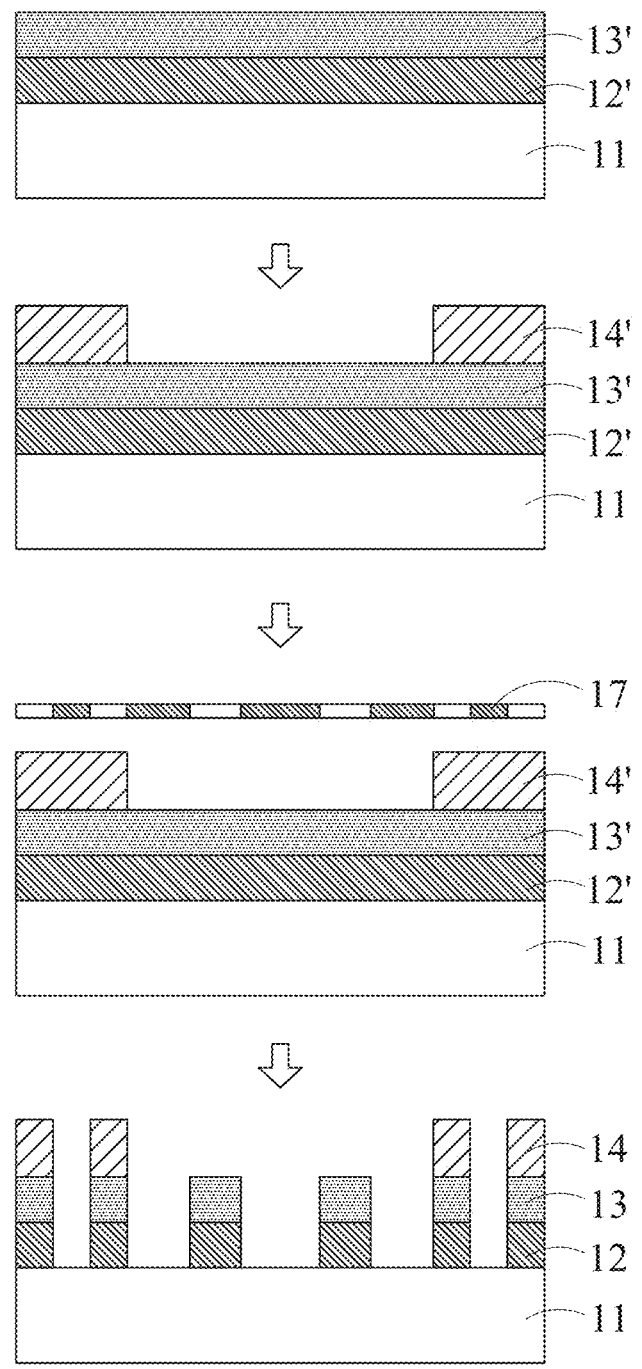
FIG. 2 shows schematic views of a process flow of producing the photosensitive electrically conductive structure according to the first embodiment of the present disclosure.

In the first embodiment, the process flow of producing the photosensitive electrically conductive structure 10 is as follows (see FIG. 2):

1. coat a releasing photosensitizing resin composition 12' and a nano silver composition 13' on the substrate 11 sequentially;

2. coat a photosensitive electrically conductive composition 14' on an edge of the nano silver composition 13';

3. put mask 17 with a required pattern on substrate 11, such that a light ray selectively irradiates releasing photosensitizing resin composition 12' and photosensitive electrically conductive composition 14' with mask 17 to selectively cure the releasing photosensitizing resin composition 12' and photosensitive electrically conductive composition 14'; and 4. allow releasing photosensitizing resin composition 12' and photosensitive electrically conductive composition 14' to come into contact with a developer to dissolve releasing photosensitizing resin composition 12', then remove the developer, thereby producing photosensitive electrically conductive structure 10 comprising the patterned releasing photosensitizing resin layer 12, nano silver layer 13, and photosensitive electrically conductive layer 14.

In this embodiment, substrate 11 is a polyethylene terephthalate (PET) substrate, but the present disclosure is not limited thereto. Persons skilled in the art may choose to use any other substrate, such as cyclic olefin polymer (COP), colorless polyimide (CPI), as needed.

In the process flow of producing the photosensitive electrically conductive structure 10 of this embodiment, the releasing photosensitizing resin layer 12 is produced by coating a releasing photosensitizing resin composition 12' on the substrate 11 and selectively curing the releasing photosensitizing resin composition 12', wherein the releasing photosensitizing resin composition 12' comprises: 5 parts by weight of 1-[4-(phenylthio)phenyl]-heptane-1,2-dione 2-(O-phenacyl oxime) as (A) a photopolymerization initiator; 20 parts by weight of trimethylolpropane tri(meth) acrylate as (B) a polymeric compound and/or a compound with an ethylenically unsaturated double bond; and 75 parts by weight of propylene glycol methyl ether (PGME) as a solvent (C), but the present disclosure is not limited thereto. Persons skilled in the art may select appropriate constituents and content thereof of the releasing photosensitizing resin composition 12' as needed, provided that the average molecular weight (Mn) of the releasing photosensitizing resin layer 12 formed by curing the releasing photosensitizing resin composition 12' is greater than 3,000 but less than 20,000.

In the process flow of producing the photosensitive electrically conductive structure 10 of this embodiment, examples of (A) a photopolymerization initiator include, but are not limited to: oxime photoinitiator, triazine photoinitiator, acetophenone, biimidazole, or benzophenone. Their content ranges from 1 to 10 parts by weight, although the present disclosure is not limited to the aforementioned content ranges.

In the process flow of producing the photosensitive electrically conductive structure 10 of this embodiment, (B) a polymeric compound and/or a compound with an ethylenically unsaturated double bond is one selected from the group consisting of acrylic ester, polyurethane, and acrylate resin, but the present disclosure is not limited thereto. Other examples of the polymeric compound and/or the compound with an ethylenically unsaturated double bond include, but are not limited to: methacrylic acid/methyl methacrylate/2-ethylhexyl methacrylate copolymer, methacrylic acid/benzyl methacrylate/2-ethylhexyl methacrylate copolymer, methacrylic acid/2-hydroxyethyl methacrylate/benzyl methacrylate/2-ethylhexyl methacrylate copolymer, methacrylic acid/benzyl methacrylate/N-phenylmaleimide/2-ethylhexyl methacrylate copolymer, methacrylic acid/2-ethylhexyl methacrylate/styrene/benzyl methacrylate copolymer, methacrylic acid/mono(2-propenoxyethyl) succinate/styrene/2-ethylhexyl methacrylate copolymer, methacrylic acid/benzyl methacrylate/2-ethylhexyl methacrylate/glycerol monomethacrylate copolymer. Their content ranges from 20 to 40 parts by weight, although the present disclosure is not limited to the aforementioned content ranges.

In the process flow of producing the photosensitive electrically conductive structure 10 of this embodiment, other examples of a solvent (C) include, but are not limited to: (poly)alkylene glycol monoalkyl ether solvents, such as ethylene glycol methyl ether, ethylene glycol ethyl ether, diethylene glycol methyl ether, diethylene glycol ethyl ether, diethylene glycol n-propyl ether, diethylene glycol n-butyl ether, triethylene glycol methyl ether, triethylene glycol ethyl ether, propylene glycol methyl ether, propylene glycol ethyl ether, dipropylene glycol methyl ether, dipropylene glycol ethyl ether, dipropylene glycol n-propyl ether, dipropylene glycol n-butyl ether, tripropylene glycol mono methyl ether, and tripropylene glycol mono ethyl ether; (poly)alkylene glycol monoalkyl ether acetate solvents, such as ethylene glycol methyl ether acetate, ethylene glycol ethyl ether acetate, propylene glycol methyl ether acetate, and propylene glycol ethyl ether acetate; other ether solvents, such as diethylene glycol dimethyl ether, diethylene glycol methyl ethyl ether, diethylene glycol diethyl ether, and tetrahydrofuran; ketone solvents, such as methyl ethyl ketone, cyclohexanone, 2-heptanone, 3-heptanone, and 4-hydroxy-4-methyl-2-pentanone; alkyl lactate solvents, such as methyl 2-hydroxypropionate, and ethyl 2-hydroxypropionate; other ester solvents, such as methyl 2-hydroxy-2-methylpropionate, ethyl 2-hydroxy-2-methylpropionate, methyl 3-methoxypropionate, ethyl 3-methoxypropionate, methyl 3-ethoxypropionate, ethyl 3-ethoxypropionate, ethyl ethoxyacetate, ethyl hydroxyacetate, methyl 2-hydroxy-3-methylbutyrate, 3-methyl-3-methoxybutyl acetate, 3-methyl-3-methoxybutyl propionate, ethyl acetate, n-butyl acetate, n-propyl acetate, isopropyl acetate, n-butyl acetate, isobutyl acetate, n-pentyl acetate, isoamyl acetate, n-butyl propionate, ethyl butyrate, n-propyl butyrate, isopropyl butyrate, n-butyl butyrate, methyl pyruvate, ethyl pyruvate, n-propyl pyruvate, methyl acetylacetate, ethyl acetylacetate, and ethyl 2-oxybutyrate. Their content ranges from 50 to 80 parts by weight, although the present disclosure is not limited to the aforementioned content ranges.

In another embodiment, the releasing photosensitizing resin composition 12' further comprises: (D) additive. Examples of appropriate additive include, but are not limited to: fluorine-containing surfactant, non-ionic surfactant, cation surfactant, anion surfactant, and organic silicon surfactant, alone or in combination.

In the process flow of producing the photosensitive electrically conductive structure 10 of this embodiment, nano silver layer 13 is formed by coating the nano silver composition 13' on the substrate 11, wherein the nano silver composition 13' comprises: nanowire dispersion liquid, solvent, and surfactant.

In the process flow of producing the photosensitive electrically conductive structure 10 of this embodiment, the photosensitive electrically conductive layer 14 is produced by coating a photosensitive electrically conductive composition 14' on the substrate 11 and selectively curing the photosensitive electrically conductive composition 14', wherein the photosensitive electrically conductive composition 14' comprises: electrically conductive filler, surfactant, resin, and photosensitizing agent.

The developer used in the process flow of producing the photosensitive electrically conductive structure 10 of this embodiment is propylene glycol methyl ether (PGME). Persons skilled in the art may select an appropriate developer as needed. Preferably, the developer is a solvent developer. In addition to propylene glycol methyl ether (PGME) used in this embodiment, appropriate solvent developers include, but are not limited to: diacetone alcohol (DAA), diethylene glycol monomethyl ether (DGME), and isopropyl alcohol (IPA).

Second Embodiment

Figure 3:
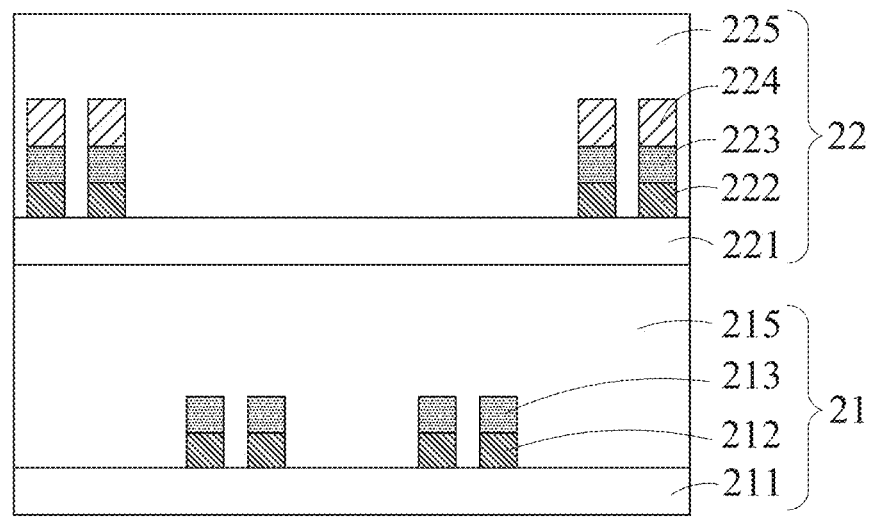
FIG. 3 is a schematic view of a touch sensor according to a second embodiment of the present disclosure.

FIG. 3 is a schematic view of a touch sensor according to the second embodiment of the present disclosure. Referring to FIG. 3, touch sensor 20 of this embodiment comprises: a first photosensitive electrically conductive structure 21; and a second photosensitive electrically conductive structure 22 disposed on first photosensitive electrically conductive structure 21. The first photosensitive electrically conductive structure 21 comprises: a first substrate 211; a first releasing photosensitizing resin layer 212 disposed on the first substrate 211; a first nano silver layer 213 disposed on the first releasing photosensitizing resin layer 212; and a first optically clear adhesive (OCA) 215 disposed on the first nano silver layer 213. The second photosensitive electrically conductive structure 22 comprises: a second substrate 221; a second releasing photosensitizing resin layer 222 disposed on the second substrate 221; a second nano silver layer 223 disposed on the second releasing photosensitizing resin layer 222; a second photosensitive electrically conductive layer 224 disposed on the second nano silver layer 223; and a second optically clear adhesive (OCA) 225 disposed on the second photosensitive electrically conductive layer 224. The average molecular weight (Mn) of the first releasing photosensitizing resin layer 212 and second releasing photosensitizing resin layer 222 is greater than 3,000 but less than 100,000. The first releasing photosensitizing resin layer 212, first nano silver layer 213, second releasing photosensitizing resin layer 222, second nano silver layer 223, and second photosensitive electrically conductive layer 224 are patterned; thus, the first releasing photosensitizing resin layer 212 and first nano silver layer 213 cover only part of the first substrate 211; second releasing photosensitizing resin layer 222, second nano silver layer 223 and second photosensitive electrically conductive layer 224 cover only part of the second substrate 221.

The touch sensor 20 of the second embodiment undergoes a process flow of production as follows:

1. produce first photosensitive electrically conductive structure 21 and second photosensitive electrically conductive structure 22 by the process flow of production of the first embodiment, further including the steps of coating and curing first optically clear adhesive (OCA) 215 and second optically clear adhesive (OCA) 225, but dispensing with the step of coating photosensitive electrically conductive composition on the edge of first nano silver layer 213, because first photosensitive electrically conductive structure 21 does not include photosensitive electrically conductive layer; and 2. adhere together first photosensitive electrically conductive structure 21 and second photosensitive electrically conductive structure 22 to finish producing touch sensor 20 of this embodiment.

Third Embodiment

Figure 4:
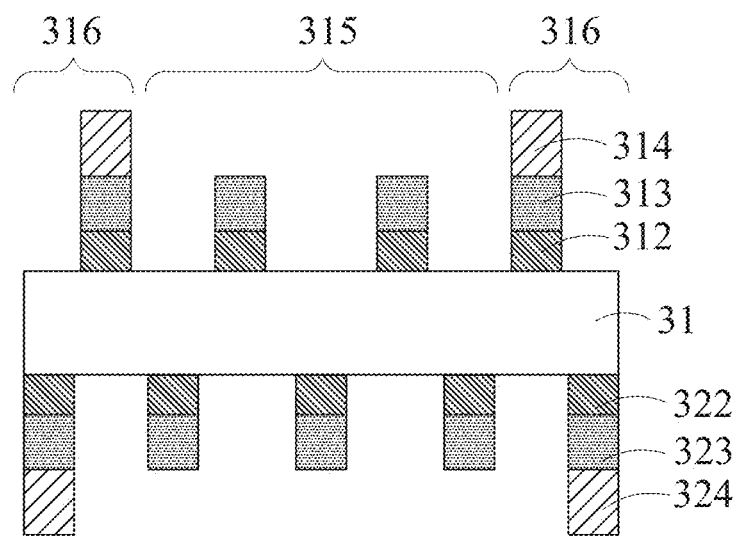
FIG. 4 is a schematic view of a touch sensor according to a third embodiment of the present disclosure.

FIG. 4 is a schematic view of a touch sensor according to the third embodiment of the present disclosure. Referring to FIG. 4, a photosensitive electrically conductive structure 30 of this embodiment comprises: a substrate 31; a first releasing photosensitizing resin layer 312 disposed on the substrate 31; a first nano silver layer 313 disposed on the first releasing photosensitizing resin layer 312; a first photosensitive electrically conductive layer 314 disposed on the edge of the first nano silver layer 313. A visible region 315 is defined in the photosensitive electrically conductive structure 30 where the first nano silver layer 313 is not covered by the first photosensitive electrically conductive layer 314 and a peripheral wiring region 316 is defined in the photosensitive electrically conductive structure 30 where the first nano silver layer 313 is covered by the first photosensitive electrically conductive layer 314. The photosensitive electrically conductive structure 30 of this embodiment further comprises: a second releasing photosensitizing resin layer 322 disposed below the substrate 31; a second nano silver layer 323 disposed below the second releasing photosensitizing resin layer 322; and a second photosensitive electrically conductive layer 324 disposed within the peripheral wiring region 316 below the second nano silver layer 323. The first releasing photosensitizing resin layer 312 and the second releasing photosensitizing resin layer 322 each has an average molecular weight (Mn) greater than 3,000 but less than 100,000. The photosensitive electrically conductive structure 30 undergoes an exposure-development process whereby the first releasing photosensitizing resin layer 312, the first nano silver layer 313 and the first photosensitive electrically conductive layer 314 are patterned simultaneously. The photosensitive electrically conductive structure 30 undergoes another exposure-development process whereby the second releasing photosensitizing resin layer 322, the second nano silver layer 323, and the second photosensitive electrically conductive layer 324 are patterned simultaneously.

Compared with the first embodiment, the third embodiment has a distinguishing technical feature as follows: the releasing photosensitizing resin layer, nano silver layer and photosensitive electrically conductive layer are disposed on two sides of the substrate 31.

Figure 5:
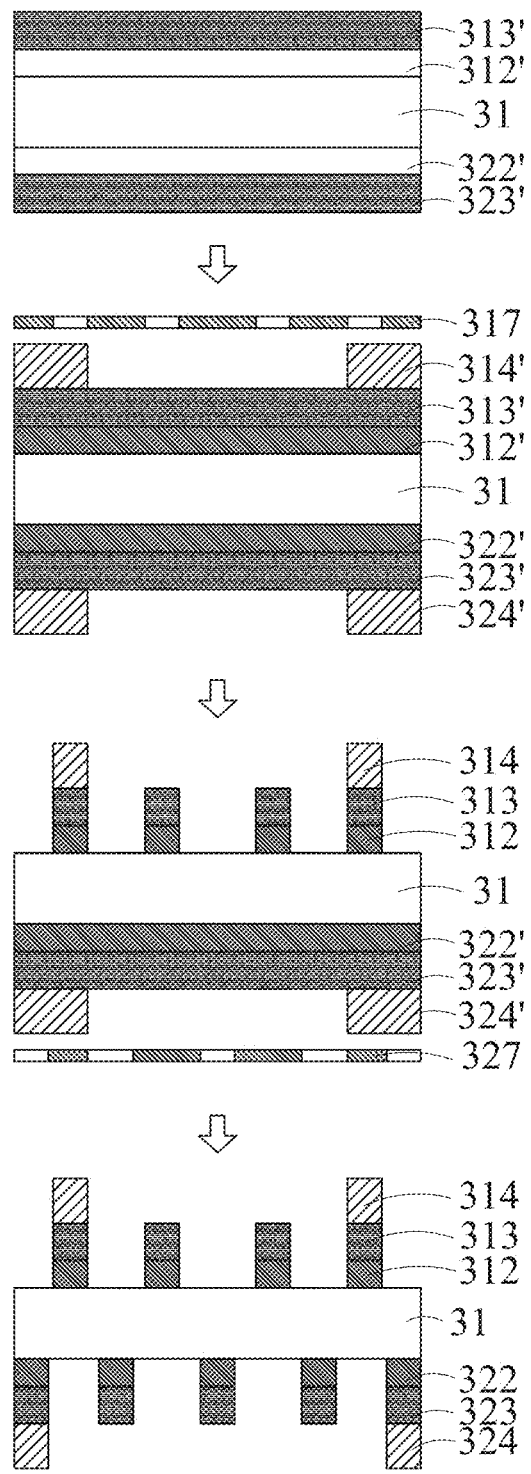
FIG. 5 shows schematic views of a process flow of producing the photosensitive electrically conductive structure according to the third embodiment of the present disclosure.

In the third embodiment, the process flow of producing the photosensitive electrically conductive structure 30 is as follows (see FIG. 5):

1. coat first releasing photosensitizing resin composition 312', second releasing photosensitizing resin composition 322', first nano silver composition 313', second nano silver composition 323', first photosensitive electrically conductive composition 314', and second photosensitive electrically conductive composition 324' on two sides of substrate 31 sequentially;

2. put first mask 317 with a required pattern on substrate 31, such that a light ray selectively irradiates first releasing photosensitizing resin composition 312' and first photosensitive electrically conductive composition 314' on the upper side of substrate 31 with first mask 317 to selectively cure first releasing photosensitizing resin composition 312' and first photosensitive electrically conductive composition 314' on the upper side of substrate 31;

3. put second mask 327 with a required pattern below substrate 31, such that a light ray selectively irradiates second releasing photosensitizing resin composition 322' and second photosensitive electrically conductive composition 324' on the lower side of substrate 31 with second mask 327 to selectively cure second releasing photosensitizing resin composition 322' and second photosensitive electrically conductive composition 324' on the lower side of substrate 31; and 4. allow first releasing photosensitizing resin composition 312', second releasing photosensitizing resin composition 322', first photosensitive electrically conductive composition 314', and second photosensitive electrically conductive composition 324' on the upper and lower sides of substrate 31 to come into contact with a developer to dissolve first releasing photosensitizing resin composition 312' and second releasing photosensitizing resin composition 322' with the developer, then remove the developer, thereby producing photosensitive electrically conductive structure 30 comprising the patterned first releasing photosensitizing resin layer 312, first nano silver layer 313, first photosensitive electrically conductive layer 314, second releasing photosensitizing resin layer 322, second nano silver layer 323 and second photosensitive electrically conductive layer 324.

Test 1

This test involves producing a photosensitive electrically conductive structure by the method disclosed in the first embodiment and keeping the average molecular weight (Mn) of the releasing photosensitizing resin layer within a range greater than 100,000, a range of 20,000-100,000, and a range less than 20,000. This test is conducted with four developers, namely propylene glycol methyl ether (PGME), diacetone alcohol (DAA), diethylene glycol monomethyl ether (DGME) and isopropyl alcohol (IPA) to compare the levels of performance of the developers which the releasing photosensitizing resin layer of the aforesaid ranges of average molecular weight (Mn) is subjected to. The test results are shown in Table 1 below.

TABLE 1

| average molecular weight (Mn) | PGMEA | PGME | IPA | DAA |
| --- | --- | --- | --- | --- |
| >100,000 | X | X | X | X |
| 20,000~100,000 | X | ○ | X | ○ |
| <20,000 | ○ | ◎ | ○ | ○ |

Key:
developer performance: ◎: excellent; ○: good; X: bad

As shown in Table 1, good development is achieved with two developers, namely PGME and DAA, when the average molecular weight (Mn) of the releasing photosensitizing resin layer falls within the range of 20,000-100,000. Furthermore, good or excellent development is achieved with four developers, namely PGMEA, PGME, IPA, and DAA, when the average molecular weight (Mn) of the releasing photosensitizing resin layer is less than 20,000.

Test 2

This test involves producing a photosensitive electrically conductive structure by the method disclosed in the first embodiment and keeping the molecular weight of the polymeric compound (B) for use in the process flow of production within a range greater than 20,000, a range of 10,000-

20,000, a range of 3,000-6,000, and a range less than 1,000 to compare the levels of performance of the developers which the polymeric compound (B) of different molecular weights is subjected to. The test results are shown in Table 2 below and FIG. 6.

TABLE 2

|  | molecular weight | developer performance |
|---|---|---|
| test 2-1 | >20,000 | Δ |
| test 2-2 | 10,000~200,000 | Δ |
| test 2-3 | 3,000~6,000 | ◎ |
| test 2-4 | <1,000 | ◎ |

Key: developer performance: ◎: excellent; Δ: good

Figure 6:
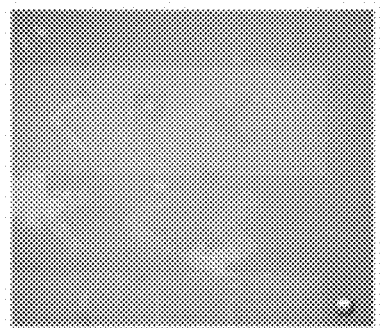
FIG. 6 shows pictures of test results of test 2.
Figure 6:
Figure 6:
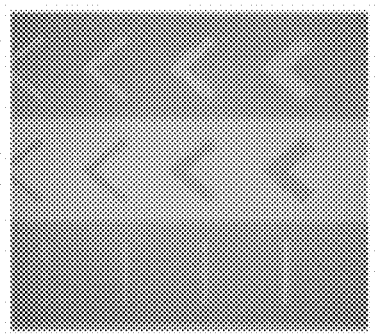
Figure 6:
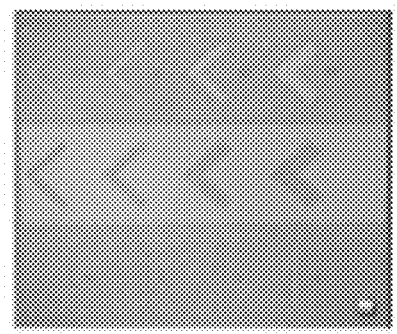

As shown in Table 2 and FIG. 6, developer performance is always good when the molecular weight of the polymeric compound (B) for use in the process flow of production is greater than 20,000 or ranges from 10,000 to 20,000. Furthermore, the resolution of excellent developer performance is 12 μm when the molecular weight of the polymeric compound (B) for use in the process flow of production ranges from 3,000 to 6,000 or is less than 1,000.

Test 3

Figure 7:
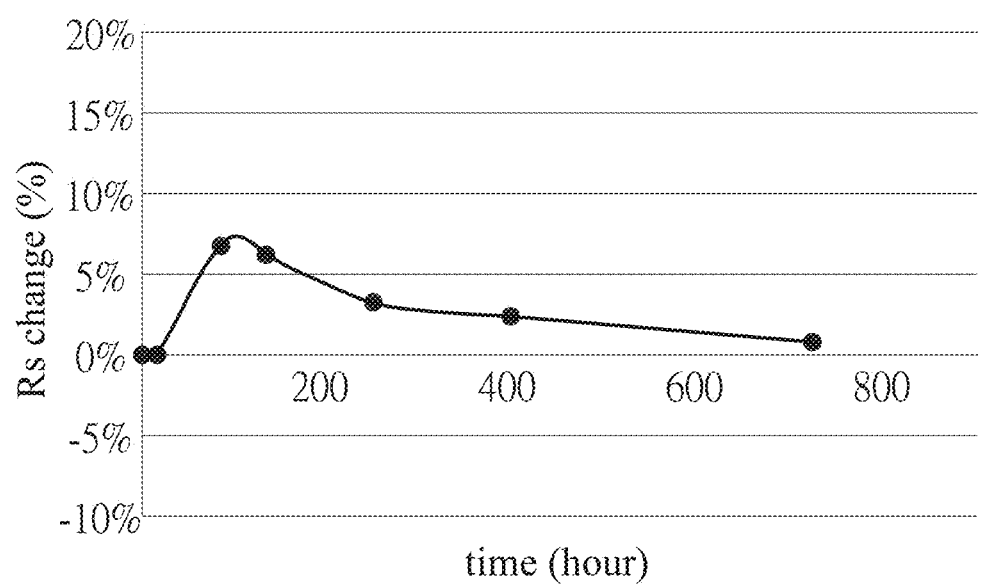
FIG. 7 is a graph of test results of test 3.

This test involves performing a high-temperature high-humidity test on the touch sensor of the second embodiment at 85° C. and relative humidity of 85%, and the test results are shown in FIG. 7. Resistance (Rs) change (%) is expressed by the equation: initial face resistance—time-dependent face resistance/initial face resistance.

Referring to FIG. 7, the touch sensor of the second embodiment demonstrates satisfactory tolerance to a high-temperature, high-humidity environment, as indicated by the fact that Rs change (%) turns out to be less than 10% at the end of 700 hours of the test in the high-temperature high-humidity environment.

Test 4

This test involves performing an optical test on the photosensitive electrically conductive structure of the first embodiment, and the test results in CIE L*a*b* color space (also referred to as CIELAB color space) are shown in Table 3 below.

TABLE 3

| L | 96.08 |
|---|---|
| a* | −0.44 |
| b* | 1.00 |
| haze | 0.98 |
| T (%) | 92.3 |

CIE L*a*b* color space is composed of three values: L* for lightness from black (0) to white (100); a* from green (−) to red (+); and b* from blue (−) to yellow (+). T (%) corresponds to transparency percentage.

As shown in Table 3, the photosensitive electrically conductive structure of the first embodiment demonstrates satisfactory optical characteristics and yields the satisfactory test results in the test on degree of penetration (T (%)) and yellowing value (b*). Therefore, the photosensitive electrically conductive structure of the first embodiment meets the standards of photosensitive electrically conductive structures in the inductor sector nowadays.

In conclusion, according to the present disclosure, the photosensitive electrically conductive structure and the touch sensor comprising the photosensitive electrically conductive structure have at least the following technical advantages:

1. The photosensitive electrically conductive structure undergoes an exposure-development process whereby the releasing photosensitizing resin layer, the nano silver layer, and the photosensitive electrically conductive layer are patterned simultaneously; thus, the production process of the photosensitive electrically conductive structure is not only simple and quick but also incurs low cost.

2. The exposure-development process is performed on the visible region in the photosensitive electrically conductive structure, allowing the releasing photosensitizing resin layer and nano silver layer to be patterned simultaneously, not to mention that there is no significant difference in optical properties between the visible region and the substrate.

3. Within the peripheral wiring region of the photosensitive electrically conductive structure, the photosensitive electrically conductive layer works well with the nano silver layer below to not only enhance the stability of touch signals of the touch sensor but also preclude high contact impedance otherwise caused by poor alignment during a screen printing process of a conventional touch sensor.

4. The photosensitive electrically conductive structure demonstrates satisfactory resolution to facilitate production of fine wiring and thus meet the needs for thin border application, because of good control over the average molecular weight (Mn) of the releasing photosensitizing resin layer in the photosensitive electrically conductive structure or good control over the molecular weight of the polymeric compound (B) for use in the process flow of production.

5. The photosensitive electrically conductive structure and touch sensor of the present disclosure can be manufactured by continuous mass production, using roll-to-roll manufacturing technology, thereby effectively increasing overall production efficiency.

While the present disclosure has been described by means of specific embodiments, numerous modifications and variations could be made thereto by those skilled in the art without departing from the scope and spirit of the present disclosure set forth in the claims.

What is claimed is:

1. A photosensitive electrically conductive structure comprising:
   a substrate;
   a releasing photosensitizing resin layer disposed on the substrate;
   a nano silver layer disposed on the releasing photosensitizing resin layer; and
   a photosensitive electrically conductive layer disposed on an edge of the nano silver layer, wherein a visible region is defined in the photosensitive electrically conductive structure where the nano silver layer is not covered by the photosensitive electrically conductive layer and a peripheral wiring region is defined in the photosensitive electrically conductive structure where the nano silver layer is covered by the photosensitive electrically conductive layer,
   wherein the releasing photosensitizing resin layer has an average molecular weight (Mn) greater than 3,000 but less than 100,000,
   wherein the releasing photosensitizing resin layer, the nano silver layer and the photosensitive electrically conductive layer are patterned.

2. The photosensitive electrically conductive structure of claim 1, wherein the average molecular weight (Mn) of the releasing photosensitizing resin layer is greater than 3,000 but less than 20,000.

3. The photosensitive electrically conductive structure of claim 1, wherein the releasing photosensitizing resin layer is formed by coating a releasing photosensitizing resin composition on the substrate and selectively curing the releasing photosensitizing resin composition, wherein the releasing photosensitizing resin composition comprises:
- (A) a photopolymerization initiator;
- (B) at least one of a polymeric compound or a compound with an ethylenically unsaturated double bond; and
- (C) a solvent,
    wherein the at least one of the polymeric compound or the compound with an ethylenically unsaturated double bond is selected from the group consisting of acrylic ester, polyurethane and acrylate resin.

4. The photosensitive electrically conductive structure of claim 3, wherein the releasing photosensitizing resin composition further comprises:
- (D) an additive.

5. The photosensitive electrically conductive structure of claim 4, wherein the additive is selected from the group consisting of fluorine-containing surfactant, non-ionic surfactant, cation surfactant, anion surfactant and organic silicon surfactant.

6. The photosensitive electrically conductive structure of claim 3, wherein the polymeric compound has a molecular weight greater than 500 but less than 10,000.

7. The photosensitive electrically conductive structure of claim 3, wherein the polymeric compound has a molecular weight greater than 3,000 but less than 6,000.

8. The photosensitive electrically conductive structure of claim 3, wherein the polymeric compound has a molecular weight less than 1,000.

9. The photosensitive electrically conductive structure of claim 1, wherein a degree of penetration of optical performance of the visible region is greater than 90%, and a yellowing value $b^*$ of the visible region is not greater than 2.

10. The photosensitive electrically conductive structure of claim 1, wherein the releasing photosensitizing resin layer, the nano silver layer, and the photosensitive electrically conductive layer are patterned simultaneously by an exposure-development process.

11. The photosensitive electrically conductive structure of claim 10, wherein the exposure-development process performs development with a solvent developer, and the solvent developer is selected from the group consisting of propylene glycol methyl ether (PGME), diacetone alcohol (DAA), diethylene glycol monomethyl ether (DGME), and isopropyl alcohol (IPA).

12. The photosensitive electrically conductive structure of claim 1, further comprising:
- a second releasing photosensitizing resin layer disposed below the substrate;
- a second nano silver layer disposed below the second releasing photosensitizing resin layer; and
- a second photosensitive electrically conductive layer disposed within the peripheral wiring region below an edge of the second nano silver layer,
    wherein the second releasing photosensitizing resin layer has an average molecular weight (Mn) greater than 3,000 but less than 100,000,
    wherein the second releasing photosensitizing resin layer, the second nano silver layer and the second photosensitive electrically conductive layer are patterned.

13. A touch sensor comprising at least one layer of the photosensitive electrically conductive structure of claim 1.

14. The photosensitive electrically conductive structure of claim 1, wherein the releasing photosensitizing resin layer is in direct contact with the substrate.

15. The photosensitive electrically conductive structure of claim 14, wherein the nano silver layer is disposed over the releasing photosensitizing resin layer in the visible region.

16. The photosensitive electrically conductive structure of claim 14, wherein the nano silver layer is in direct contact with the releasing photosensitizing resin layer.

17. The photosensitive electrically conductive structure of claim 1, wherein the nano silver layer is disposed over the releasing photosensitizing resin layer in the visible region.

18. The photosensitive electrically conductive structure of claim 1, wherein the nano silver layer is in direct contact with the releasing photosensitizing resin layer.

19. The photosensitive electrically conductive structure of claim 1, wherein a sidewall of the releasing photosensitizing resin layer, a sidewall of the nano silver layer, and a sidewall of the nano silver layer are co-planar.

20. The photosensitive electrically conductive structure of claim 1, wherein a sidewall of the nano silver layer and a sidewall of the nano silver layer are co-planar in the visible region.

* * * * *